US012507002B2

(12) United States Patent
Chang et al.

(10) Patent No.: US 12,507,002 B2
(45) Date of Patent: Dec. 23, 2025

(54) ELECTRONIC APPARATUS COMPRISING SOUND RADIATION UNIT

(71) Applicant: SAMSUNG ELECTRONICS CO., LTD., Suwon-si (KR)

(72) Inventors: Juhee Chang, Suwon-si (KR); Jinyong Kim, Suwon-si (KR); Byeongmin Lee, Suwon-si (KR); Yonghoon Lee, Suwon-si (KR); Jeock Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 372 days.

(21) Appl. No.: 18/105,412

(22) Filed: Feb. 3, 2023

(65) Prior Publication Data

US 2023/0179912 A1 Jun. 8, 2023

Related U.S. Application Data

(63) Continuation of application No. PCT/KR2021/009798, filed on Jul. 28, 2021.

(30) Foreign Application Priority Data

Aug. 4, 2020 (KR) ........................ 10-2020-0097316

(51) Int. Cl.
*H04R 1/34* (2006.01)
*H04R 1/02* (2006.01)
*H04R 1/10* (2006.01)

(52) U.S. Cl.
CPC ............... *H04R 1/345* (2013.01); *H04R 1/02* (2013.01); *H04R 1/1016* (2013.01)

(58) Field of Classification Search
CPC ........ H04R 1/345; H04R 1/02; H04R 1/1016; H04R 25/603; H04R 25/65; H04R 25/604;

(Continued)

(56) References Cited

U.S. PATENT DOCUMENTS 8,213,668 B2 * 7/2012 Tsao ..................... H04R 1/1016 381/381
8,391,536 B2 * 3/2013 Hashimoto .......... H04R 1/1016 381/370

(Continued)

FOREIGN PATENT DOCUMENTS

CN 204190914 3/2015
CN 206698398 12/2017

(Continued)

OTHER PUBLICATIONS

Korean Notice of Patent Grant issued Sep. 30, 2024 in corresponding Korean Patent Application No. 10-2020-0097316.

(Continued)

*Primary Examiner* — Oyesola C Ojo
(74) *Attorney, Agent, or Firm* — Nixon & Vanderhye P.C.

(57) ABSTRACT

An electronic apparatus according to an embodiment may comprise: a housing including a first housing having a first surface facing a first direction and a second housing having a second surface facing a second direction opposite to the first direction; a first audio port having a sound hole formed in the first surface of the housing; a speaker arranged in the housing and configured to output the sound to the outside via the sound hole of the first audio port; and a first recess formed by extending from the first audio port, wherein the first recess extends from the first audio port by a first length to have a first depth and a first width and is configured to form a passage through which the sound output from the speaker moves while the electronic apparatus is worn.

15 Claims, 17 Drawing Sheets

(58) Field of Classification Search
CPC .... H04R 1/04; H04R 1/1025; H04R 2420/07; H04R 1/1008; H04R 1/1041; H04R 2460/09; H04R 1/1075; H04R 1/34; H04R 5/027; H04R 25/40; H04R 25/60
See application file for complete search history.

(56) References Cited

U.S. PATENT DOCUMENTS

| | | | | |
|---|---|---|---|---|
| 8,891,799 | B2 * | 11/2014 | Fujikura | H04R 1/1091 381/380 |
| 9,154,868 | B2 | 10/2015 | Narayan et al. | |
| 9,338,543 | B2 | 5/2016 | Huang | |
| 9,412,356 | B1 * | 8/2016 | Baker | G10K 11/17855 |
| 9,848,257 | B2 * | 12/2017 | Ambrose | H04R 1/1016 |
| 10,051,357 | B2 * | 8/2018 | Silvestri | H04R 1/2823 |
| 11,917,347 | B2 * | 2/2024 | Moon | H04R 1/345 |
| 2002/0080990 | A1 * | 6/2002 | Lin | H04R 1/1016 381/372 |
| 2008/0013774 | A1 * | 1/2008 | Hosaka | H04R 1/2842 381/380 |
| 2012/0163649 | A1 * | 6/2012 | Haapapuro | H04R 3/08 381/380 |
| 2012/0275635 | A1 * | 11/2012 | Chen | H04R 1/1075 381/380 |
| 2013/0136294 | A1 | 5/2013 | Lee et al. | |
| 2015/0358708 | A1 * | 12/2015 | Axelsson | H04R 1/08 381/71.7 |
| 2017/0070808 | A1 | 3/2017 | Howes | |
| 2017/0347172 | A1 * | 11/2017 | Kim | H05K 5/03 |
| 2018/0139523 | A1 * | 5/2018 | Takahashi | H04R 1/025 |
| 2018/0227660 | A1 | 8/2018 | Azmi et al. | |
| 2019/0327550 | A1 | 10/2019 | Lindén et al. | |
| 2020/0178003 | A1 * | 6/2020 | Zurbruegg | H04R 25/604 |
| 2020/0186907 | A1 | 6/2020 | Kim et al. | |
| 2022/0248126 | A1 * | 8/2022 | Hasegawa | G10K 11/002 |

FOREIGN PATENT DOCUMENTS

| | | | | |
|---|---|---|---|---|
| CN | 206698398 U | * | 12/2017 | H04R 1/10 |
| CN | 108718430 A | * | 10/2018 | H04R 1/1091 |
| CN | 208597154 | | 3/2019 | |
| CN | 209731515 | | 12/2019 | |
| CN | 108718430 | | 5/2020 | |
| JP | 2014-14074 | | 1/2014 | |
| JP | 2015-061115 | | 3/2015 | |
| JP | 2015-61115 | | 3/2015 | |
| JP | 2015061115 A | * | 3/2015 | H04R 1/10 |
| JP | 2020-14197 | | 1/2020 | |
| KR | 101644738 | | 8/2016 | |
| KR | 10-2020-0069650 | | 6/2020 | |

OTHER PUBLICATIONS

Office Action dated Jun. 21, 2024 issued in Korean Patent Application No. 10-2020-0097316 and English-language translation.

Lee et al., "Anthropometric Analysis of 3D Ear Scans of Koreans and Caucasians for Ear Product Design", Ergonomics, ISSN: 0014-0139 (Print) 1366-5847 (Online) Journal : http://www.tandfonline.com/loi/terg20, Jul. 10, 2018, 38 pages.

International Search Report for PCT/KR2021/009798 mailed Nov. 24, 2021, 7 pages.

Written Opinion of the ISA for PCT/KR2021/009798 mailed Nov. 24, 2021, 4 pages.

* cited by examiner

ELECTRONIC APPARATUS COMPRISING SOUND RADIATION UNIT

CROSS-REFERENCE TO RELATED APPLICATIONS

This application is a continuation of International Application No. PCT/KR2021/009798 designating the United States, filed on Jul. 28, 2021, in the Korean Intellectual Property Receiving Office and claiming priority to Korean Patent Application No. 10-2020-0097316, filed on Aug. 4, 2020, in the Korean Intellectual Property Office, the disclosures of which are incorporated by reference herein in their entireties.

BACKGROUND

Field

The disclosure relates to a design structure of an electronic device (e.g., a wired or wireless earphone and a hearing aid) including a sound port.

Description of Related Art

An electronic device (e.g., a wireless earphone) including a sound port may be manufactured in a canal type and an open type. An electronic device corresponding to the canal type may include an ear tip corresponding to the size and shape of a user's ear, and may provide audio to the user while blocking external noise with the ear tip. An electronic device corresponding to an open type may not include an ear tip and may be worn on the user's ear to provide audio. Various embodiments disclosed herein relate to an electronic device corresponding to the open type.

An electronic device corresponding to the open type does not include an ear tip and is wearable on a user's ear, and the conditions under which the electronic device is worn may vary depending on the size and shape of the user's ear. The characteristics of audio signals output through the electronic device and acquired through the user's ear may vary depending on the conditions under which the electronic device is worn. For example, when the sound port (or an audio port having a sound hole) of the electronic device is not blocked, audio signals corresponding to all bands (e.g., low, middle, and high frequency bands) may be output through the sound port of the electronic device and acquired through the user's ear. As another example, when the sound port of the electronic device is at least partially blocked, the audio signals output through the sound port of the electronic device may be acquired through the user's ear in the state where the audio signals corresponding to the high frequency band are reduced.

SUMMARY

Embodiments of the disclosure provide a dimple structure connected to a sound port of an electronic device such that, even when the sound port of the electronic device is at least partially blocked, the degree of change in the characteristics of audio signals output through the electronic device and acquired through a user's ear is reduced.

An electronic device according to an example embodiment disclosed herein may include: a housing comprising a first housing including a first surface facing a first direction and a second housing including a second surface facing a second direction opposite to the first direction; a first audio port including a sound hole disposed in the first surface of the housing; a speaker disposed inside the housing and configured to output sound to the outside through the sound hole of the first audio port; and a first recess extending from the first audio port. The first recess may extend from the first audio port by a first length in a first depth and a first width and may be configured to provide a path through which the sound output from the speaker moves in a state in which the electronic device is worn.

According to various example embodiments disclosed herein, the electronic device may include a dimple structure connected to the sound port and extending from the sound port. Even when the sound port is at least partially blocked by wearing the electronic device on the user's ear, the dimple structure is able to reduce the degree of change in the characteristics (e.g., deterioration of sound quality) of audio signals output through the sound port and acquired through a user's ear. In addition, various effects directly or indirectly identified through the disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

In connection with the description of the drawings, the same or similar components may be denoted by the same or similar reference numerals.

DETAILED DESCRIPTION

Hereinafter, various example embodiments will be described with reference to the accompanying drawings. However, it should be understood that the embodiments are not intended to limit the disclosure, and include various modifications, equivalents, and/or alternatives thereof.

Figure 1:
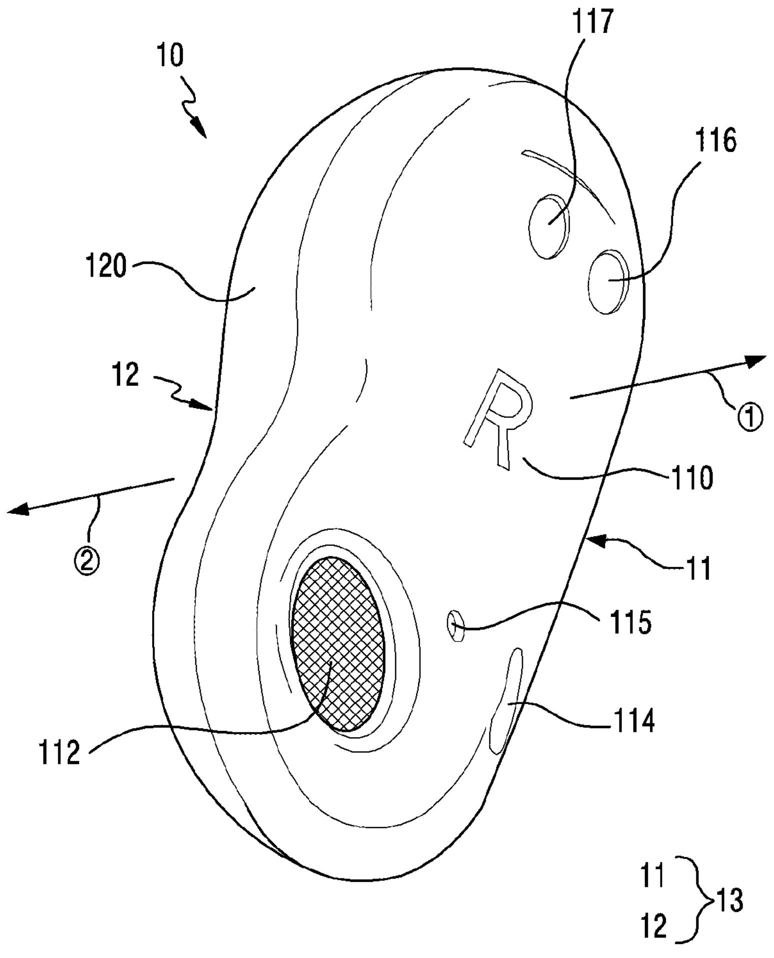
FIGS. 1 and 2 are perspective views illustrating the exterior of an electronic device according to various embodiments
Figure 2:
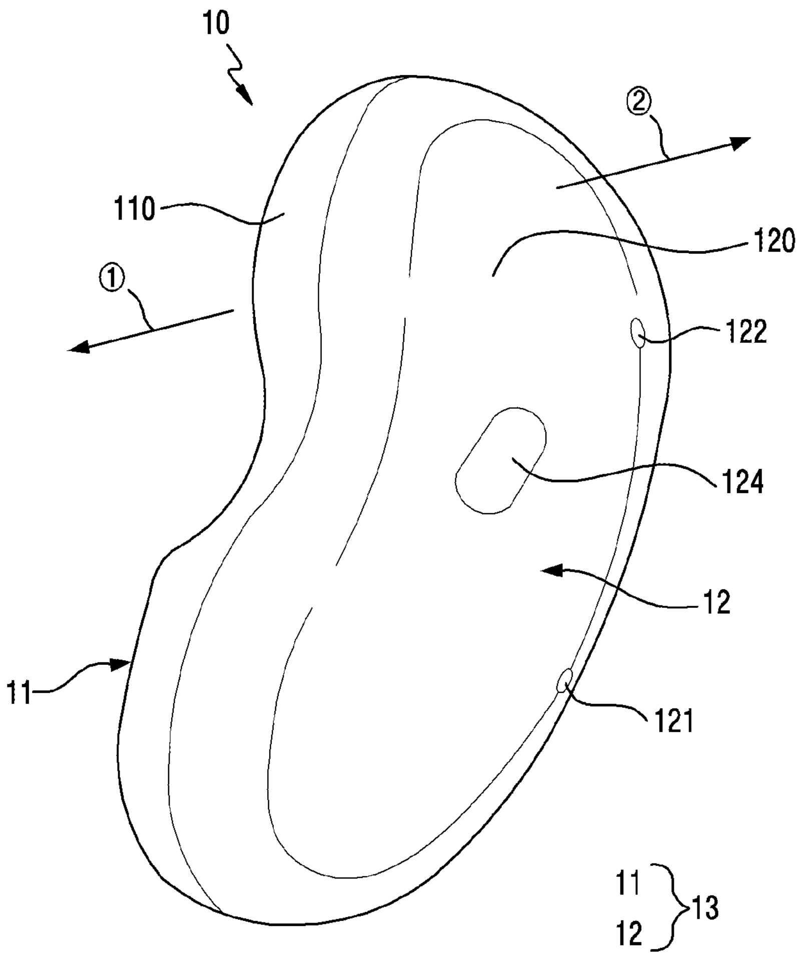
Figure 3:
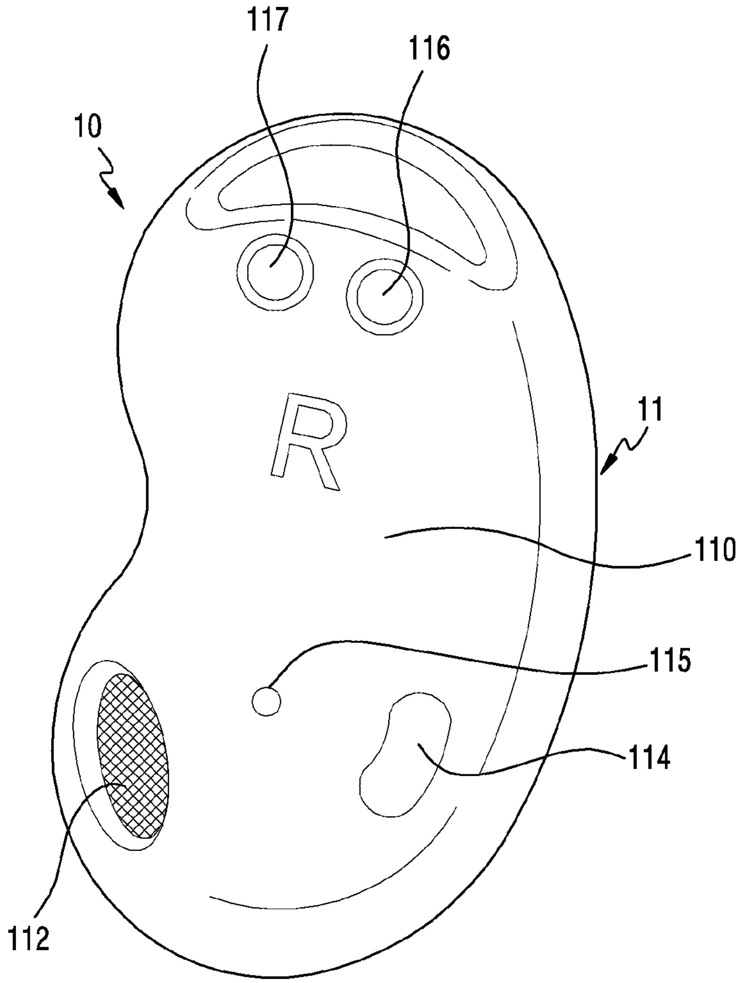
FIG. 3 is a diagram illustrating the exterior of the electronic device according to various embodiments

FIGS. 1 and 2 are perspective views illustrating the exterior of an electronic device 10 according various embodiments, and FIG. 3 is a diagram illustrating the exterior of the electronic device 10 according to various embodiments.

Referring to FIGS. 1, 2 and 3 (which may be referred to as FIGS. 1 to 3), the electronic device 10 may be a wearable device that is wearable on an ear. The electronic device 10 may be a wearable device that is wearable on the eternal ear in a user's ear. For example, the electronic device 10 may be a right wireless earphone of a pair of wireless earphones (e.g., a left wireless earphone and a right wireless earphone).

According to an embodiment, the electronic device 10 may be a wearable device worn on a right ear. The electronic device 10 may include a first surface 110 and a second surface 120. The letter "R" representing that the electronic device 10 is a wearable device to be worn on the right ear may be indicated on the first surface 110. Although not illustrated in FIG. 1, in an electronic device to be paired with the electronic device 10 and worn on the left ear (e.g., the electronic device 15 in FIG. 4B or the electronic device 15 in FIG. 8), the letter "L" representing that the electronic device is a wearable device to be worn on the left ear may be indicated on a surface corresponding to the first surface 110 of the electronic device 10 (e.g., the third surface 810 in FIG. 8).

According to an embodiment, the electronic device 10 may include a housing 13 in which a plurality of components are mounted. The housing 13 may include a first housing 11 including a first surface 110 facing a first direction (1) and a second housing 12 including a second surface 120 facing a second direction 2. The first direction (1) and the second direction 2 may be opposite to each other. For example, the first surface 110 and the second surface 120 may partially include curved surfaces.

According to an embodiment, the first surface 110 of the first housing 11 may include a speaker nozzle 112 (or an audio port including a sound hole), a first port 114, and one or more charging terminals 116 and 117. Sound output from a speaker disposed inside the housing 13 may be output to the outside through the audio port 112 including the sound hole.

According to an embodiment, the speaker nozzle 112 may be disposed on one surface (e.g., the first surface 110 or the second surface 120) of the housing 13 such that the sound output from the speaker disposed inside the housing 13 is output (or propagated) to the outside of the electronic device 10 through one or more audio ports disposed on one surface of the housing 13 (e.g., the first surface 110 or the second surface 120). For example, the speaker nozzle 112 may be disposed on the first surface 110 of the first housing 11 such that the sound output from the speaker disposed inside the housing 13 is output (or propagated) to the outside of the electronic device 10 through the one or more audio ports disposed on the first surface 110 of the first housing 11. The speaker nozzle 112 may include one or more openings and may be made of at least one of a metal material and a polymer material. The speaker nozzle 112 may include a foreign matter blocking member 263 (Referring to FIG. 5A or FIG. 6) that prevents and/or reduces the inflow of foreign matter (e.g., dust or moisture). The speaker nozzle 112 may be exposed to the outside of the electronic device 10 through at least a portion of the first surface 110.

According to an embodiment, the first port 114 may include a leakage port. The first port 114 may be exposed to the outside of the electronic device 10 through at least a portion of the first surface 110.

According to an embodiment, the one or more charging terminals 116 and 117 may be disposed in a pair on one surface (e.g., the first surface 110 or the second surface 120) of the housing 13, and may be exposed to the outside of the electronic device 10 through the one surface. For example, at least one of the charging terminals 116 and 117 may be exposed to the outside of the electronic device 10 through the first surface 110 of the housing 13.

According to an embodiment, the electronic device 10 may include a sensor (e.g., a proximity sensor or a biometric sensor) configured to detect whether the electronic device 10 is worn by a user. A sensor window 115 may be disposed on one surface (e.g., the first surface 110 or the second surface 120) of the housing 13. For example, the sensor window 115 may be disposed on the first surface 110 of the first housing 11. For example, the sensor window 115 may be located between the speaker nozzle 112 and the first port 114. The position of the sensor window 115 is not limited to the above example. The sensor window 115 may be understood as an opening for operating a sensor to detect whether the electronic device 10 is worn by a user.

According to an embodiment, the second surface 120 of the second housing 12 may include one or more microphone holes 121 and 122 and a second port 124.

According to an embodiment, the one or more microphone holes 121 and 122 may be disposed on one surface (e.g., the first surface 110 or the second surface 120) of the housing 13 so that the microphone disposed inside the housing 13 acquires sound. For example, the one or more microphone holes 112 and 122 may be disposed on the second surface 120 of the second housing 12 so that the microphone disposed inside the housing 13 acquires sound.

According to an embodiment, the second port 124 is a port related to the output of the speaker and may be understood as a port used for tuning a low-pass characteristic of the speaker. The second port 124 may be disposed in a speaker's back volume space that faces the second direction 2.

According to an embodiment, on the premise that the electronic device 10 is a wearable device worn on the right ear, at least some of the description made with reference to FIGS. 1 to 3 may also be applied to the case where the electronic device 10 is a wearable device worn on the left ear based on symmetrical features.

Figure 4A:
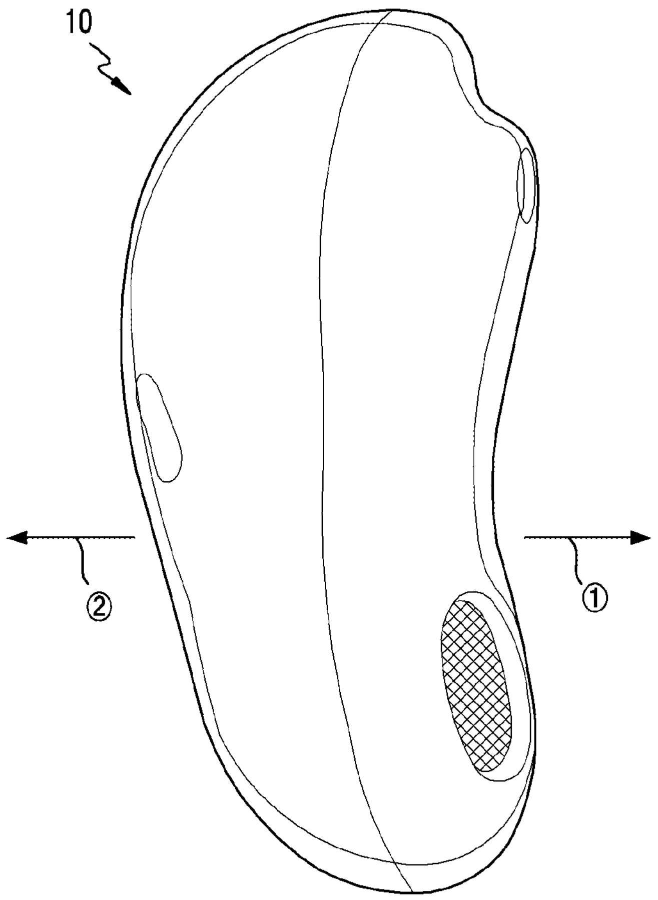
FIG. 4A is a diagram illustrating a side view of an electronic device to be worn on a right ear according to various embodiments.
Figure 4B:
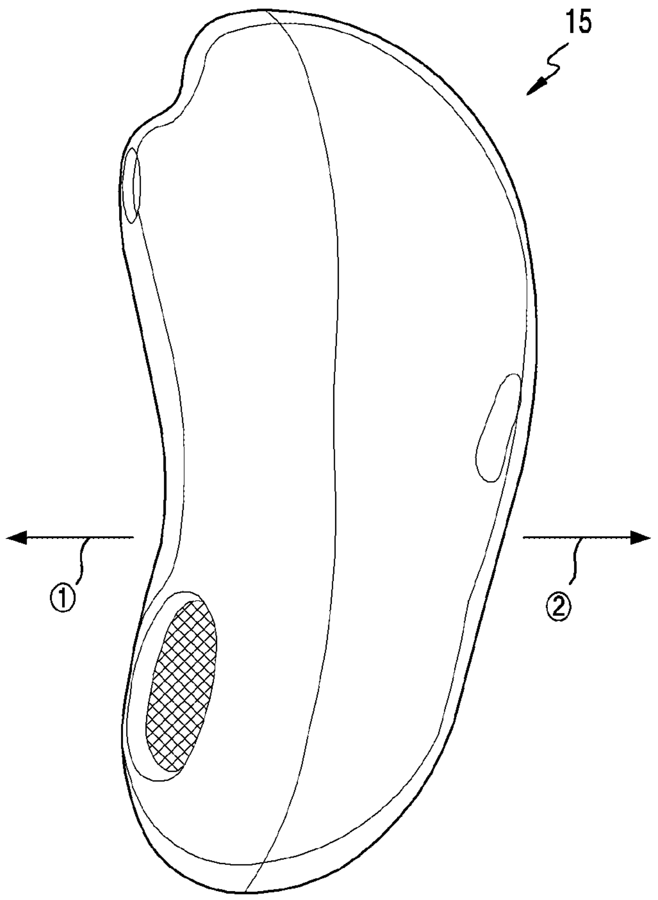
FIG. 4B is a diagram illustrating a side view of an electronic device to be worn on the left ear according to various embodiments.

FIG. 4A is a diagram illustrating a side view of an electronic device 10 to be worn on the right ear according to various embodiments, and FIG. 4B is a diagram illustrating a side view of an electronic device 15 to be worn on the left ear according to various embodiments.

Referring to FIGS. 4A and 4B, the electronic device 10 may be understood as a wearable device to be worn on an ear, and may be understood as a wearable device that is wearable on the right ear. The electronic device 15 may be understood as a wearable device to be worn on an ear, and may be understood as a wearable device that is wearable device on the left ear. The electronic device 10 and the electronic device 15 may be configured as a pair of wearable devices. For example, the wearable devices may include an electronic device 10 that is wearable on the right ear and an electronic device 15 that is wearable on the left ear. Herein, a description is made with reference to the electronic device 10 or the electronic device 15, but the above description may be substantially equally applied to symmetrical features of the electronic device 10 or the electronic device 15.

According to an embodiment, the electronic device 10 may include a head mounted display (HMD) device including augmented reality (AR) glasses or a virtual reality (VR) device. For example, an HMD device may include a wearable device that is wearable on a user's, such as the electronic device illustrated in FIGS. 1 to 4B (e.g., the electronic device 10 or the electronic device 15).

Figure 5A:
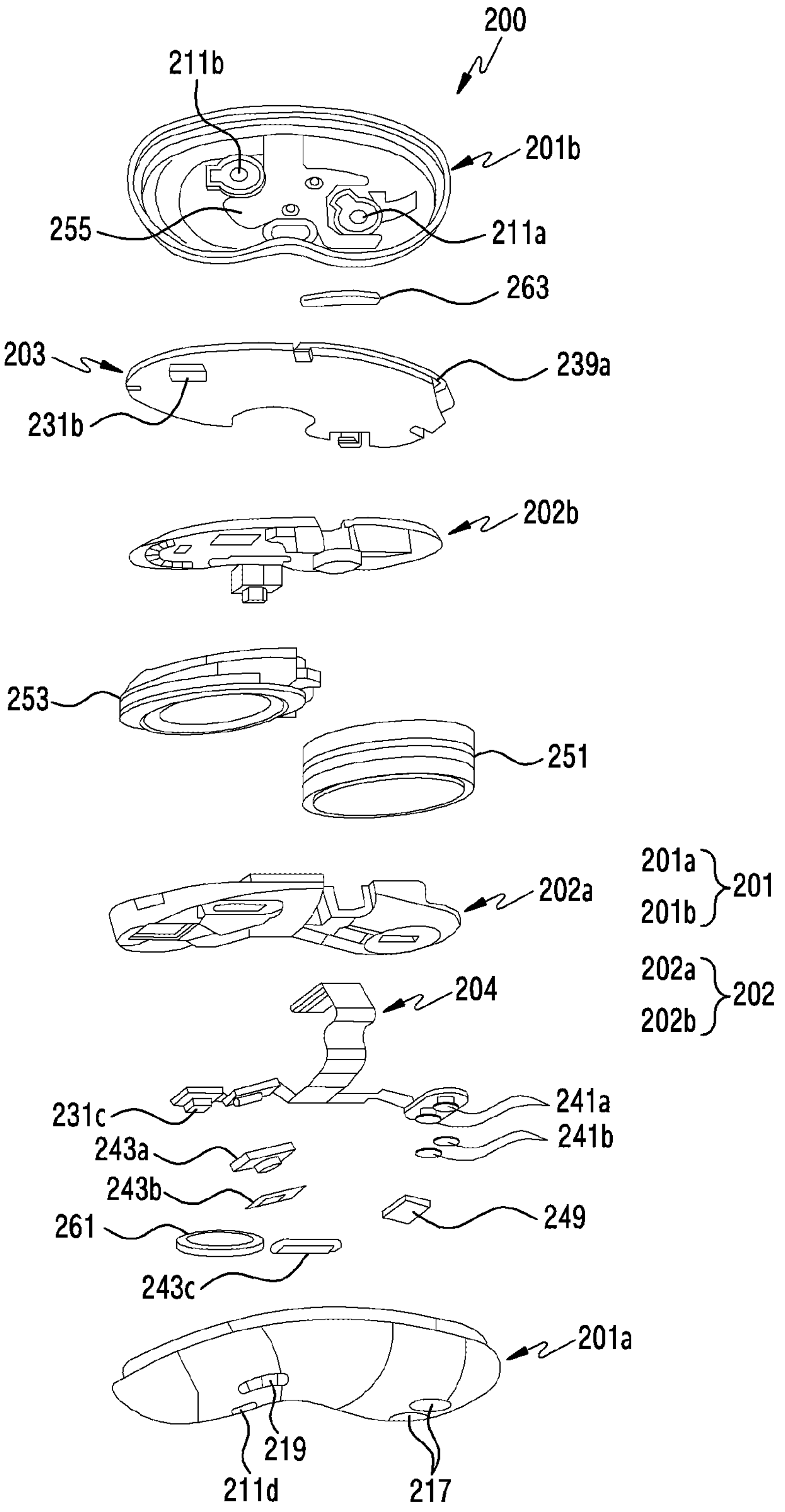
FIG. 5A is an exploded perspective view of an electronic device according to various embodiments.
Figure 5B:
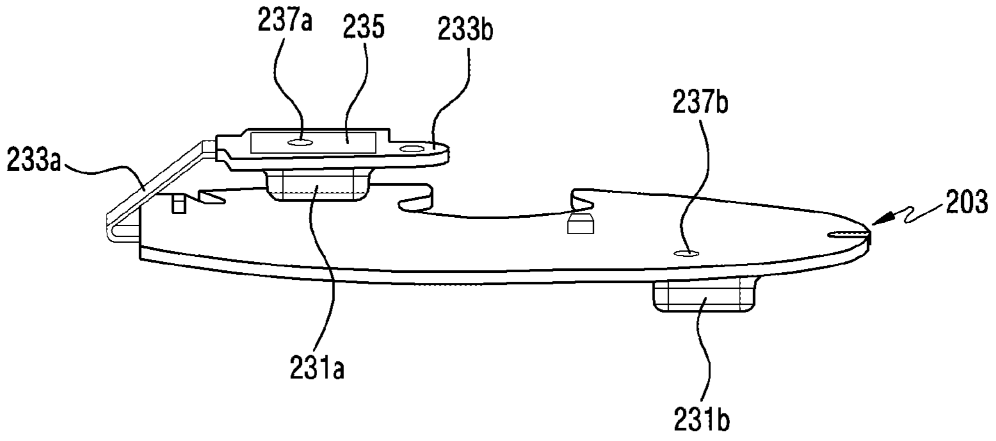
FIG. 5B is a perspective view illustrating a first circuit board of an electronic device according to various embodiments.
Figure 6:
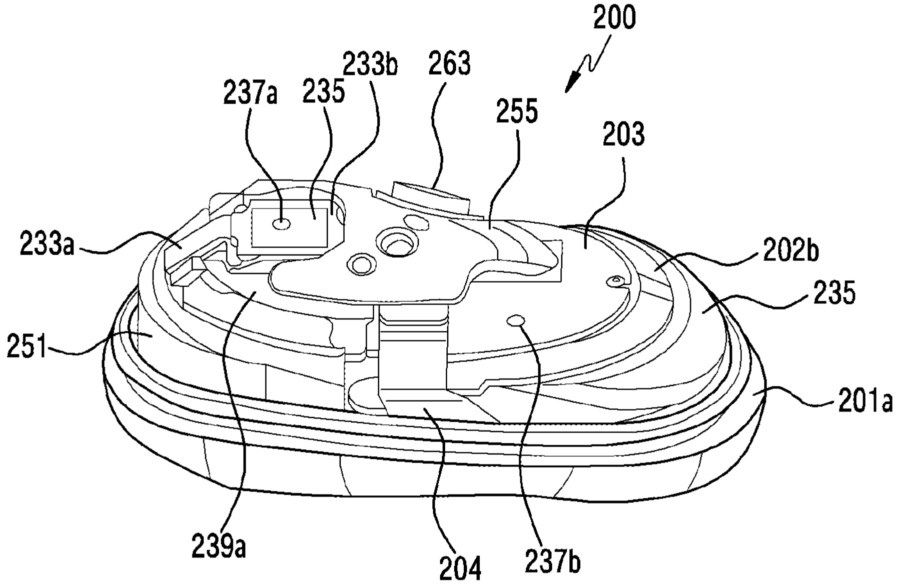
FIG. 6 is a perspective view of an electronic device according to various embodiments.

FIG. 5A is an exploded perspective view of an electronic device 200 according to various embodiments, FIG. 5B is a perspective view illustrating a first circuit board 203 of the electronic device 200 according to various embodiments, and FIG. 6 is a perspective view of the electronic device 200 according to various embodiments.

Referring to FIGS. 5A, 5B, and 6, the electronic device 200 may include a housing 201, support structures 202, a first circuit board 203, a second circuit board 204, a battery 251, a speaker unit 253, and/or an antenna member 255.

According to an embodiment, the electronic device 200 may include a plurality of microphones 231*a*, 231*b*, and 231*c* disposed on the first circuit board 203 and/or the second circuit board 204 to be capable of receiving or acquiring external sound, for example, a user's voice or sound of a surrounding environment.

According to an embodiment, the housing 201 may include a first case 201*a* and a second case 201*b*. The first case 201*a* may come into contact with the user's body. The second case 201*b* may be coupled to face the first case 201*a*.

According to an embodiment, in the state in which the electronic device 200 is worn on the user's body (e.g., ear), the first case 201 substantially comes into contact the user's body, and the second case 201*b* may be at least partially exposed to the outside.

According to an embodiment, the support structures 202 may include a first support member 202*a* and a second support member 202*b*. The first support member 202*a* and the second support member 202*b* may be coupled to face each other. The first support member 202*a* and/or the second support member 202*b* may be made of a polymer or metal material, and may be accommodated inside the housing 201 to improve the rigidity of the electronic device 200.

According to an embodiment, the support structures 202 may divide the inner space of the housing 201 into a plurality of portions. For example, the first circuit board 203 and the second circuit board 204 may be disposed inside the housing 201 at a predetermined interval by the support structures 202.

According to an embodiment, the battery 251 and/or the speaker unit 253 may be disposed inside the housing 202 in the state of being substantially wrapped in the support structures 202. The space in which the battery 251 and/or the speaker unit 253 are disposed may be separated from the space in which the first circuit board 203 and/or the second circuit board 204 are disposed using the support structures 202.

According to an embodiment, the first circuit board 203 may substantially function as a main circuit board of the electronic device 200. At least some of the components included in the electronic device 1301 of FIG. 13 may be mounted on the first circuit board 203 in the form of an integrated circuit chip. The first circuit board 203 may be disposed to face the inner surface of the second case 201*b*. For example, the first circuit board 203 may be disposed between the second case 201*b* and the second support member 202*b*. The first circuit board 203 may include a microphone 231*b*. The number of microphones (e.g., 231*a* and 231*b*) included in the first circuit board 203 may be one or more. The second circuit board 204 may include a flexible printed circuit board, and may be disposed to substantially face the inner surface of the first case 201*a* and may bypass the support structures 202 to be electrically connected to the first circuit board 203.

According to an embodiment, an electrode 241*a* may be disposed on the second circuit board 204. The electrode 241*a* may be exposed to the outside through an electrode hole 217 provided in the first case 201*a*.

According to an embodiment, the electronic device 200 may include a sealing member, for example, an O-ring 241*b* formed of an elastic material such as silicone or rubber. The O-ring 241*b* may be coupled to wrap the circumference of the electrode 241*a* to substantially seal a gap between the inner wall of the electrode hole 217 and the electrode 241*a*. According to an embodiment, one of the plurality of microphones (e.g., the microphone 231*c*) may be disposed on the second circuit board 204 to correspond to a fourth sound hole 211*d*. For example, the microphone 231*c* may receive or acquire sound input through the fourth sound hole 211*d* provided in the first case 201*a*.

According to an embodiment, the electronic device 200 may further include a sensor disposed on the second circuit board 204, for example, a proximity sensor 243*a*. The proximity sensor 243*a* may be mounted in the first case 201*a* using an adhesive member 243*b* and disposed corresponding to the optical window 219 provided on the first case 201*a*. For example, the proximity sensor 243*a* may detect, through the optical window 219, whether an external object (e.g., a user's body) approaches the electronic device 200 or whether a contact state is maintained for a predetermined period of time or longer. The optical window 243*c* may include a glass member that at least partially transmits visible light or infrared light. Based on the information detected through the proximity sensor 243*a*, the electronic device 200 (e.g., the processor 120 in FIG. 1) may determine whether the electronic device 200 is worn on a user's body.

According to an embodiment, the battery 251 may be mounted or fixed between the support structures 202 (e.g., the first support member 202*a* and the second support member 202*b*). The battery 251 is a device for supplying power to at least one component of the electronic device 200, and may include, for example, a non-rechargeable primary battery, a rechargeable secondary battery, or a fuel cell. The battery 251 may be integrally disposed inside the electronic device 200, or may be disposed to be replaced by a user. According to an embodiment, the battery 251 may be charged by power provided through the electrode 241*a*. According to an embodiment, the speaker unit 253 may be disposed on one side of the battery 251.

For example, the speaker unit 253 may be mounted or fixed between the first support member 202*a* and the second support member 202*b* and disposed in parallel to the battery 251. According to an embodiment, sound output from the speaker unit 253 may be emitted to the outside of the housing 201 or the electronic device 200 through a third sound hole 211*c* provided in the first case 201*a*. According to an embodiment, the third sound hole 211*c* may be larger than the first sound hole 211*a*, the second sound hole 211*b*, and/or the fourth sound hole 211*d*. The electronic device 200 may further include another screen member 261 disposed on the third sound hole 211*c* to block the inflow of foreign matter (e.g., dust) into the housing 201 from the outside while emitting the sound output from the speaker unit 253 to the outside.

According to an embodiment, the electronic device 200 may further include a magnetic body 249 disposed on an inner surface of the first case 201*a*. The user may carry or store the electronic device 200 in the state of being accommodated in a dedicated case (not illustrated).

According to an embodiment, in the state in which the electronic device 200 is mounted in the dedicated case, the electronic device 200 may receive charging power through the dedicated case. In the state in which the electronic device 200 is accommodated in the dedicated case, a magnetic force (e.g., an attractive force) may be applied between the magnetic body 249 and the dedicated case to fix the electronic device 200 to the dedicated case. For example, in the state in which the electronic device 200 is mounted in the dedicated case, the electronic device 200 may be stably fixed to the dedicated case even if an external force within a predetermined magnitude range is applied.

Figure 13:
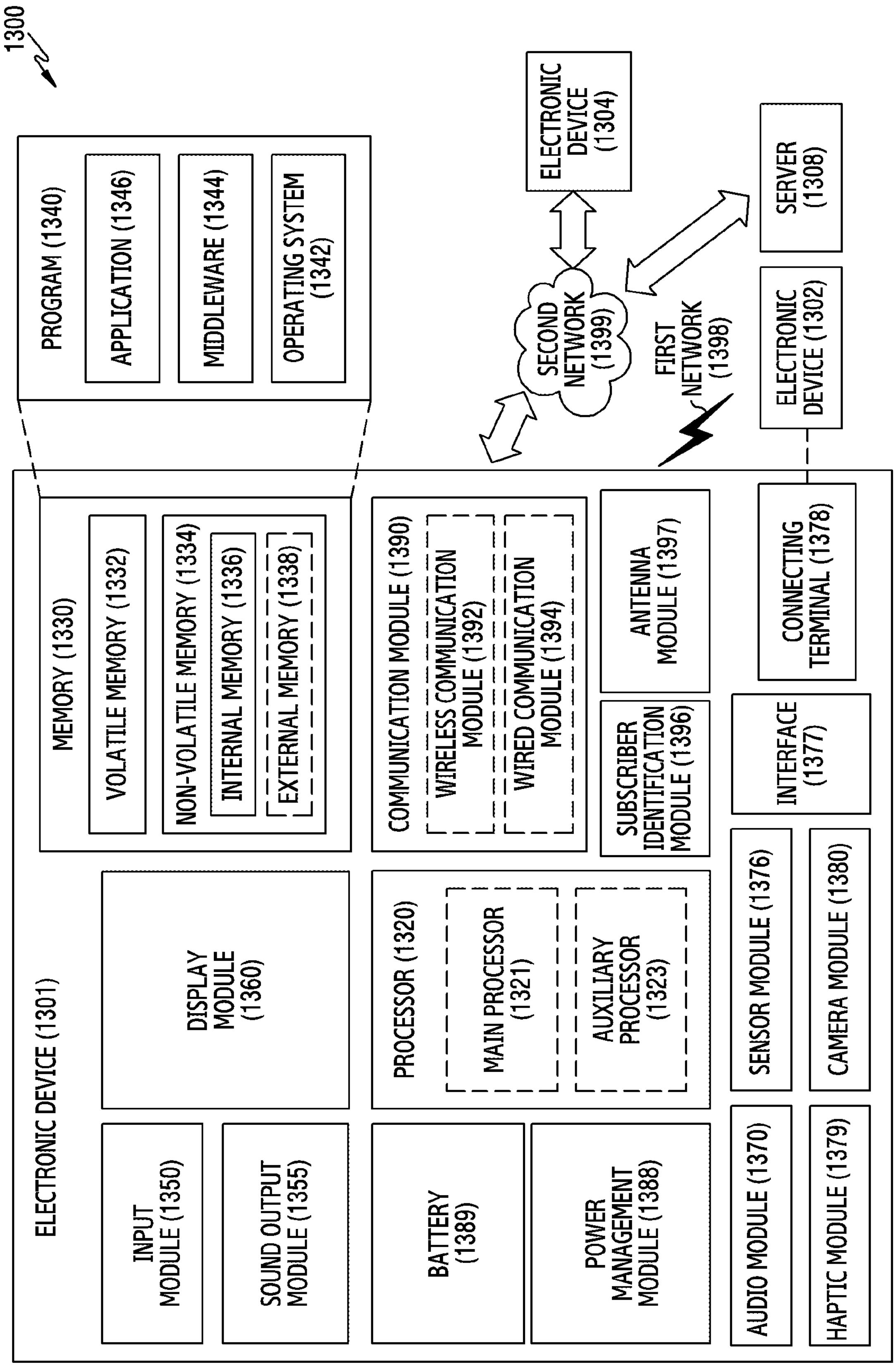
FIG. 13 is a block diagram illustrating an example electronic device in a network environment according to various embodiments.

According to an embodiment, the antenna member 255 may be disposed on an inner surface of the second case 201*b*, and may be electrically connected to, for example, the processor 1320 or the communication module 1390 in FIG. 13. For example, the processor 1320 or the communication module 1390 may execute wireless communication (e.g., Bluetooth communication) using an antenna member 255. According to an embodiment, when the user plays back music from an external electronic device (e.g., the electronic device 1302 or 1304 in FIG. 13), for example, a smartphone, the electronic device 200 may receive the music and output the music as sound.

According to an embodiment, at least two of the plurality of microphones (e.g., the microphone 231*a* and the microphone 231*b*) may be provided on the first circuit board 203.

According to an embodiment, the electronic device 200 may further include a flexible printed circuit board 233*a* extending from the first circuit board 203 and a bracket 239*a* mounted to face the first circuit board 203. Among the plurality of microphone, a first microphone 231*a* may be mounted on the flexible printed circuit board 233*a* and electrically connected to the first circuit board 203, and a second microphone 231*b* may be mounted on the first circuit board 203. In various embodiments, the flexible printed circuit board 233*a* may be interpreted as extending from the first microphone 231*a* and electrically connected to the first circuit board 203. For example, the flexible printed circuit board 233*a* may electrically connect the first microphone 231*a* to the first circuit board 203. In various embodiments, the electronic device 200 may further include a dummy board 233*b* provided at an end of the flexible printed circuit board 233*a*, and the first microphone 231*a* may be mounted on the dummy board 233*b*. According to various embodiments, the electronic device 200 may further include a touch sensor 235 provided on the dummy board 233*b*.

According to various embodiments, the electronic device 200 may further include dummy holes 237*a* and 237*b* that penetrate the first circuit board 203 and/or the dummy board 233*b*. Among the dummy holes, a first dummy hole 237*a* may provide a sound input path from the first sound hole 211*a* to the first microphone 231*a* through the dummy board 233*b*, and a second dummy hole 237*b* may provide a sound input path from the second sound hole 211*b* to the second microphone 231*b* through the first circuit board 203.

Figure 7:
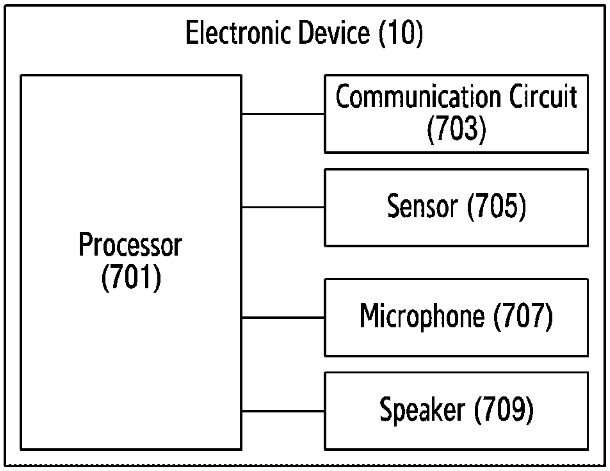
FIG. 7 is a block diagram illustrating an example configuration of an electronic device according to various embodiments.

FIG. 7 is a block diagram illustrating an example configuration of an electronic device 10 according to various embodiments.

Hereinafter, the components of the electronic device 10, which is a wearable device wearable on the right ear, are described, but may be equally applied to a wearable device that is paired with the electronic device 10 and is wearable on the left ear based on symmetrical features.

Referring to FIG. 7, the electronic device 10 may include a processor (e.g., including processing circuitry) 701, a communication circuit 703, a sensor 705, a microphone 707, and a speaker 709. A module included in the electronic device 10 may be understood as a hardware module (e.g., a circuit). The components included in the electronic device 10 may not be limited to the components illustrated in FIG. 7 (e.g., the processor 701, the communication circuit 703, the sensor 705, the microphone 707, and the speaker 709). The components of the electronic device 10 illustrated in FIG. 7 may be replaced with other components or additional components may be added to the electronic device 10. For example, at least some of the description of the electronic device 1301 of FIG. 13 may be applied to the electronic device 10 of FIG. 2. As another example, at least some of the description of the electronic device 10 of FIGS. 1 to 4B may be applied to the electronic device 10 of FIG. 2.

The processor 701 may include various processing circuitry and execute instructions stored in the memory to control components of the electronic device 10 (e.g., the processor 701, the communication circuit 703, the sensor 705, the microphone 707, and the speaker 709). The processor 701 may be electrically and/or operatively connected to the communication circuit 703, the sensor 705, the microphone 707, and the speaker 709. The processor 701 may execute software to control one or more other components connected to the processor 701 (e.g., the communication circuit 703, the sensor 705, the microphone 707, and the speaker 709).

The processor 701 may acquire commands from components included in the electronic device 10, interpret the acquired commands, and process and/or arithmetically operate various data according to the interpreted commands.

The communication circuit 703 may support communication between the electronic device 10 (e.g., a wireless earphone) and an external device (e.g., a smartphone) using wired communication or wireless communication (e.g., Bluetooth (BT), Bluetooth low energy (BLE), or Wi-Fi). For example, the electronic device 10 may communicate with an external device using short-range wireless communication (e.g., BT) via the communication circuit 703. As another example, the electronic device 10 may transmit or receive data (e.g., audio data) to or from an external device (e.g., a smartphone) connected using short-range wireless communication via the communication circuit 703.

The sensor 705 may include a sensor configured to detect whether the electronic device 10 is worn by the user. For example, the sensor 705 may include at least one of a proximity sensor or a biometric sensor. The sensor 705 is not limited to the above example, and may include a sensor configured to detect whether the electronic device 10 is worn. The electronic device 10 may detect whether or not the electronic device 10 is worn via the proximity sensor.

The microphone 707 may acquire sound. For example, the microphone 707 may acquire the user's voice or a sound generated around the electronic device 10 (e.g., music sound, conversation sound, or nature sound). The electronic device 10 may obtain audio data corresponding to sound acquired via the microphone 707. For example, the electronic device 10 may acquire audio data corresponding to conversation sound acquired via the microphone 707.

According to an embodiment, the electronic device 10 may include at least one microphone 707. For example, the electronic device 10 may include a plurality of microphones 707. The electronic device 10 may acquire sound via the plurality of microphones 707.

The speaker 709 may output sound corresponding to audio data. For example, the electronic device 10 may output, via a speaker 709, sound corresponding to audio data received from an external device (e.g., a smartphone). As another example, the electronic device 10 may output, via the speaker 709, sound corresponding to audio data acquired via the microphone 707.

Figure 8:
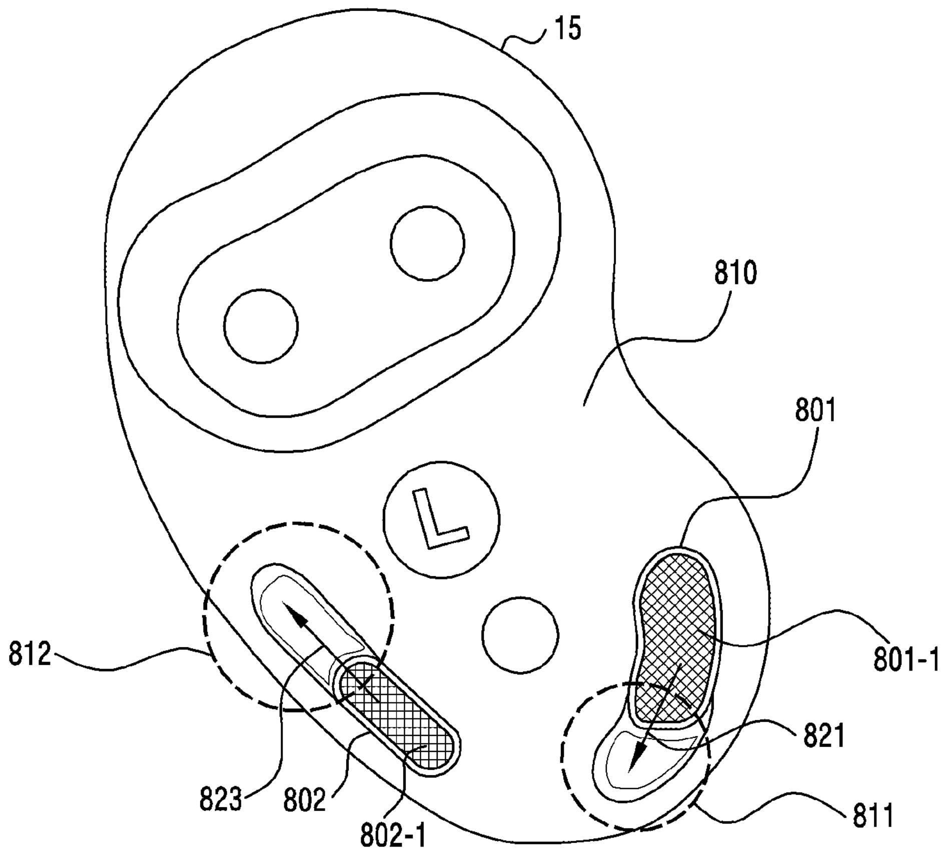
FIG. 8 is a diagram illustrating the exterior of an electronic device according to various embodiments.

FIG. 8 is a diagram illustrating the exterior of an electronic device 15 according to various embodiments.

Hereinafter, at least some of the description of the electronic device 10 illustrated in FIGS. 1 to 4A may be applied to the electronic device 15 of FIG. 8 based on symmetrical features, and a redundant description may not be repeated here.

FIG. 8 is a diagram illustrating the exterior of the electronic device 15 that is a wearable device that is wearable on the left ear.

According to an embodiment, the electronic device 15 may include a third surface 810 included in the housing and corresponding to the first surface 110 of the electronic device 10. The electronic device 15 may include, in the third surface 810, a first audio port 801 including a sound hole 801-1 and a second audio port 802 including a sound hole 802-1.

According to an embodiment, a first recess 811 may extend from the first audio port 801. The first recess 811 may extend from the first audio port 801 by a first length in a first depth and a first width, and may be configured to provide a path through which sound output from a speaker disposed inside the housing of the electronic device 15 moves in the state in which the electronic device 15 is worn. For example, the first recess 811 may be provided as a sound path such that sound output via a speaker disposed inside the housing of the electronic device 15 in the state in which the electronic device 15 is worn is output to the outside through the first audio port 801 and is transmitted toward the user's ear.

According to an embodiment, the first depth may correspond to the shortest length between one surface of the first recess 811 and an imaginary plane extending in parallel thereto from the third surface 810. The first depth may be determined to be less than or equal to the shortest length between the one surface of the first audio port 801 (e.g., the surface corresponding to the sound hole 801-1) and the imaginary surface extending in parallel thereto from the third surface 810. For example, when the shortest distance between the one surface of the sound hole 801-1 and the imaginary surface extending in parallel thereto from the third surface 810 is 0.5 mm, the first depth of the first recess 811 may be determined to be 0.3 mm corresponding to 0.5 mm or less.

According to an embodiment, a second recess 812 may extend from the second audio port 802. The second recess 812 may extend from the second audio port 802 by a second length in a second depth and a second width, and may be configured to provide a path through which sound output from a speaker disposed inside the housing of the electronic device 15 moves in the state in which the electronic device 15 is worn. For example, the second recess 812 may be provided as a sound path such that sound output via a speaker disposed inside the housing of the electronic device 15 in the state in which the electronic device 15 is worn is output to the outside through the second audio port 802 and is transmitted toward the user's ear.

According to an embodiment, the second depth may correspond to the shortest length between one surface of the second recess 812 and an imaginary surface extending in parallel thereto from the third surface 810. The second depth may be determined to be less than or equal to the shortest length between the one surface of the second audio port 802 (e.g., the surface corresponding to the sound hole 802-1) and the imaginary surface extending in parallel thereto from the third surface 810. For example, when the shortest distance between one surface of the sound hole 802-1 and an imaginary surface extending in parallel thereto from the third surface 810 is 0.4 mm, the second depth of the second recess 812 may be determined to be 0.2 mm corresponding to 0.4 mm or less. The first depth may be greater than or equal to the second depth. For example, the first depth may be 0.3 mm, and the second depth may be 0.2 mm.

According to an embodiment, the shapes, forms, and sizes of the first audio port 801 and the second audio port 802 may vary. For example, the shapes of the first audio port 801 and the second audio port 802 may be closed surfaces including curved surfaces.

According to an embodiment, sound output from the speaker 709 disposed inside the housing of the electronic device 15 to the outside through the sound hole 801-1 of the first audio port 801 may be propagated (or moved) to the first path 821 through the first recess 811. In the state in which the electronic device 15 is worn, the first path 821 may be a sound path through which the sound output to the outside through the sound hole 801-1 is directed toward the user's ear.

According to an embodiment, the sound output from the speaker 709 disposed inside the housing of the electronic device 15 to the outside through the sound hole 802-1 of the second audio port 802 may be propagated (or moved) to the second path 823 through the second recess 812. In the state in which the electronic device 15 is worn, the second path 823 may be a sound path through which the sound output to the outside through the sound hole 802-1 is directed toward the user's ear.

According to an embodiment, although not illustrated in FIG. 8, the first recess 811 and the second recess 812 may be connected to each other. For example, the first recess 811 may extend from the first audio port 801 in a first direction 821, and the second recess 812 may extend from the second audio port 802 in a direction opposite to the second direction 823.

According to an embodiment, sound output from the speaker 709 may be output to the outside through the sound hole 801-1 of the first audio port 801 and the sound hole 802-1 of the second audio port 802.

According to an embodiment, the microphone 707 may monitor sound generated from the user's ear. For example, in the state in which the electronic device 10 is worn, the microphone 707 may be disposed at a place close to the user's ear among the areas within the housing 13 of the electronic device 10 to monitor the sound generated in the user's ear. For example, the microphone 707 may be disposed in a corresponding area between the first audio port 801 and the second audio port 802 among the areas within the housing 13.

Figure 9A:
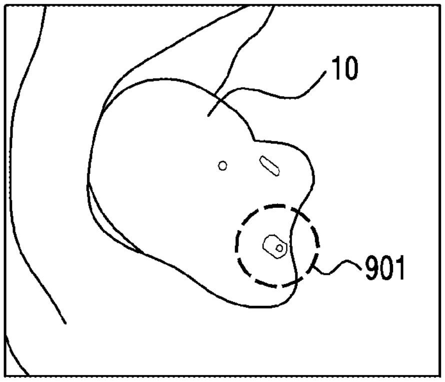
FIGS. 9A and 9B are diagrams illustrating a state in which the electronic device is worn according to various embodiments.
Figure 9B:
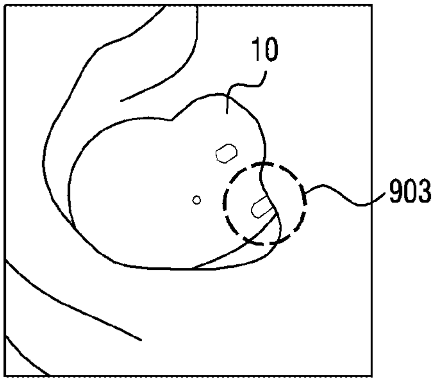

FIGS. 9A and 9B are diagrams illustrating a state in which the electronic device 10 is worn according to various embodiments.

Hereinafter, although the description is made with reference to the state in which the electronic device 10 is worn on the user's right ear, the description may be substantially equally applied to the state in which the electronic device 15 is worn on the user's left ear.

Referring to FIGS. 9A and 9B, the electronic device 10 may be worn on a portion of the user's body (e.g., the right ear). When the electronic device 10 is worn on the user's ear, the electronic device 10 may be worn as illustrated in FIG. 9A or FIG. 9B. For example, FIG. 9A illustrates an example in which the electronic device 10 is correctly worn on the user's ear, and FIG. 9B illustrates an example in which the electronic device 10 is incorrectly worn on the user's ear. 901 in FIG. 9A denotes the state in which the first microphone port including the sound hole disposed in the second surface 120 of the electronic device 10 is not blocked by the user's ear in the state in which the electronic device 10 is worn. 903 in FIG. 9B denotes the state in which at least a portion of the first microphone port including the sound hole disposed in the second surface 120 of the electronic device 10 is blocked by the user's ear in the state in which the electronic device 10 is worn.

According to an embodiment, although not illustrated in FIGS. 9A and 9B, the electronic device 10 may be worn such that the sound hole (e.g., the sound hole 801-1 in FIG. 8) provided in the first audio port (e.g., the first audio port 801 in FIG. 8) corresponding to a main sound port faces the user's ear (or eardrum), and in such a worn state, the electronic device 10 may be understood as the state of being correctly worn on the user's ear (e.g., the state illustrated in FIG. 9A). For example, the electronic device 15 of FIG. 8 may be worn such that the sound hole 801-1 of the first audio port 801 of the electronic device 15 faces the user's ear (or eardrum), and the sound hole 801-1 may not be blocked by the user's body (e.g., ear). For example, in the state in which the electronic device 15 of FIG. 8 is correctly worn, the sound output through the sound hole 801-1 of the electronic device 15 may be propagated toward the user's ear while the characteristics of the sound are being maintained. For example, in the state in which the electronic device 15 of FIG. 8 is correctly worn, the sound output through the sound hole 801-1 of the electronic device 15 corresponding to all bands (e.g., low, middle, and high frequency bands) may be propagated toward the user's ear.

Referring to FIG. 9B, the electronic device 10 may not be worn such that the sound hole (e.g., the sound hole 801-1 in FIG. 8) provided in the first audio port (e.g., the first audio port 801 in FIG. 8), which is an audio port corresponding to the main sound port, is directed to the user's ear (or eardrum). Such a worn state may be understood as the state in which the electronic device 10 is incorrectly worn on the user's ear (e.g., the state illustrated in FIG. 9B). For example, the conditions under which the electronic device 15 of FIG. 8 is worn may vary depending on the size and shape of the user's ear, and the electronic device 15 may be worn in the state in which the sound hole 801-1 of the first audio port 801 of the electronic device 15 is not directed toward the user's ear (or eardrum). In the state in which the electronic device 15 of FIG. 8 is incorrectly worn as in the state of FIG. 9B, at least a portion of the sound hole 801-1 of the first audio port 801 may be blocked by the user's body (e.g., ear). When the electronic device 15 is worn incorrectly, the sound output through the sound hole of the electronic device 15 may be propagated toward the user's ear without maintaining the characteristics thereof. For example, as for the sound output through the sound hole of the electronic device 15 in the state in which the electronic device 15 of FIG. 8 is incorrectly worn, the degree of propagation of the sound corresponding to the middle and high frequency bands toward the user's ear may be reduced among the above-mentioned bands included in the sound output through the sound hole of the electronic device 15. When the electronic device 15 is incorrectly worn, the degree of propagation of the sound corresponding to the high frequency band toward the user's ear among the bands of the sound propagated to the outside through the sound hole may be reduced, and as the degree of propagation of the sound corresponding to the high frequency band is reduced, the user may feel deterioration in sound quality. The effect depending the degree of blockage of the first audio port 801 of FIG. 8 will be described in greater detail below with reference to the graph of FIG. 10.

Figure 10:
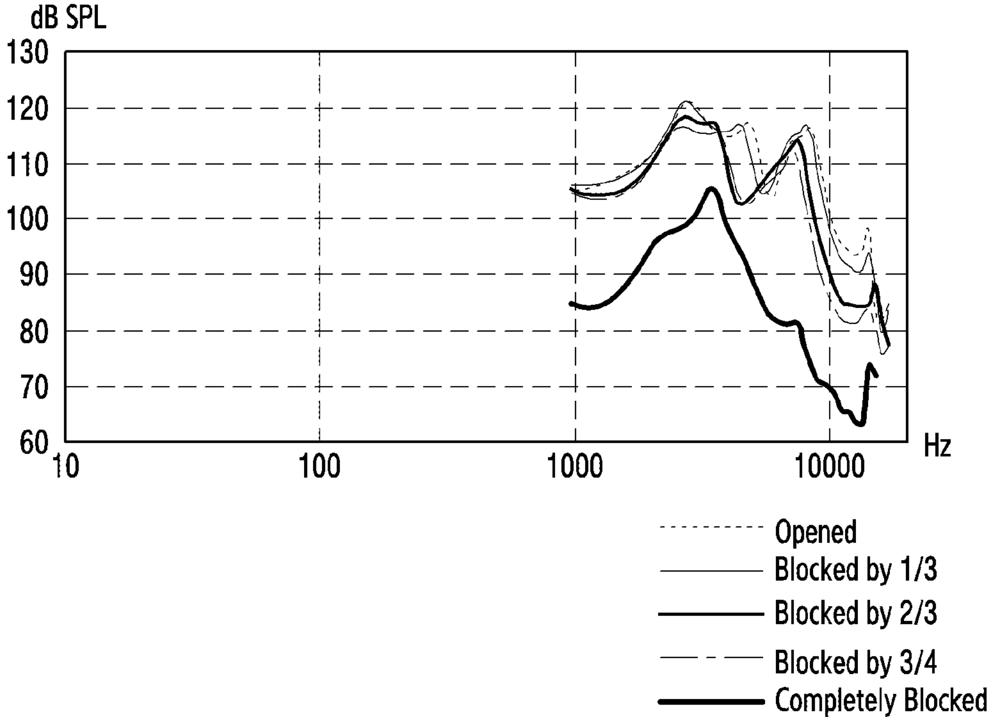
FIG. 10 is a graph illustrating an effect on sound acquired through a user's ear depending on the degree of blockage of the first audio port according to various embodiments.

FIG. 10 is a graph illustrating an effect on sound acquired through the user's ear depending on the degree of blockage of the first audio port 801 according to various embodiments.

Hereinafter, although the description has been made with reference to the electronic device 15, the description may also be applied to the electronic device 10 based on symmetrical features.

Referring to FIG. 10, the characteristics of the sound output through the first audio port 801 and acquired through the user's ear vary depending on the degree of blockage of the first audio port 801 of the electronic device 15. The x-axis of the graph shown in FIG. 10 represents Hz and the y-axis represents dB SPL. The graph may show variations in the characteristics of sound acquired through the user's ear depending on the degree of blockage of the first audio port 801 for a high frequency band (e.g., 1000 Hz or higher). The graph outlines shown in FIG. 10 may correspond to data measured while blocking the first audio port 801 in the state both of the first audio port 801 and the second audio port 802 of the electronic device 15 are in the open state. The graph outlines shown in FIG. 10 may refer, for example, to data acquired when the decibel (dB) of sound reaching the user's ear in a high-frequency band was measured in each of the case where the first audio port 801 is open without being blocked, the case where the first audio port 801 is blocked by ⅓, the case where the first audio port 801 is blocked by ⅔, the case where the first audio port is blocked by ¾, and the case where the first audio port is completely blocked. The above graph outlines show that, in all cases from the case where the first audio port 801 is not blocked to the case where the first audio port 801 is completely blocked, the decibel of the sound acquired by the user tends to decrease as the sound corresponds to a higher frequency band. In order to alleviate a phenomenon in which sound corresponding to a higher frequency band is not propagated to the user's ear when the first audio port 801 is blocked, the first recess 811 may extend from the first audio port 801. The effect on the characteristics of sound propagated toward the user's ear when the first recess 811 extends from the first audio port 801 will be described in greater detail below with reference to the graph of FIG. 11.

Figure 11:
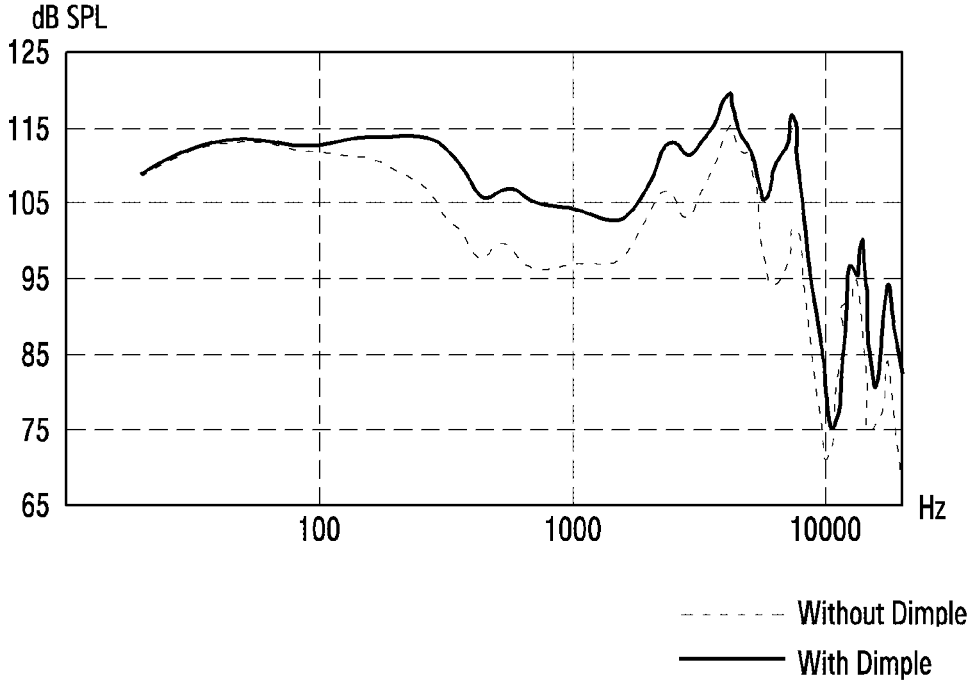
FIG. 11 is a graph illustrating an effect on sound acquired through a user's ear depending on whether a recess is present or not according to various embodiments.

FIG. 11 is a graph illustrating an effect on sound acquired through a user's ear depending on whether a recess is present or not according to various embodiments.

Hereinafter, although the description has been made with reference to the electronic device 15, the description may also be applied to the electronic device 10 based on symmetrical features.

Referring to FIG. 11, the graph shown in FIG. 11 shows data about decibels of sound acquired through the user's ear depending on whether the electronic device 15 includes the first recess 811 or not. The dimple indicated in FIG. 11 may refer, for example, to the first recess 811. Referring to the graph of FIG. 11, in both the case where the electronic device 15 includes dimples and the case where the electronic device does not include dimples, as the sound output through the first audio port corresponds to a higher frequency band, the decibel of the sound acquired through the user's ear may decrease. Comparing the case where the electronic device 15 includes the dimples with the case where the electronic device 15 does not include the dimples, the decibel of the sound acquired through the user's ear in the case where the electronic device 15 does not include the dimples (e.g., the first recess 812) may be less than that in the case where the electronic device 15 includes the dimples. In the case where the electronic device 15 does not include the first recess 811, the decibel of sound acquired by the user may be lower than that in the case where the electronic device 15 includes the first recess 811, and the deterioration of sound quality may be felt.

Figure 12A:
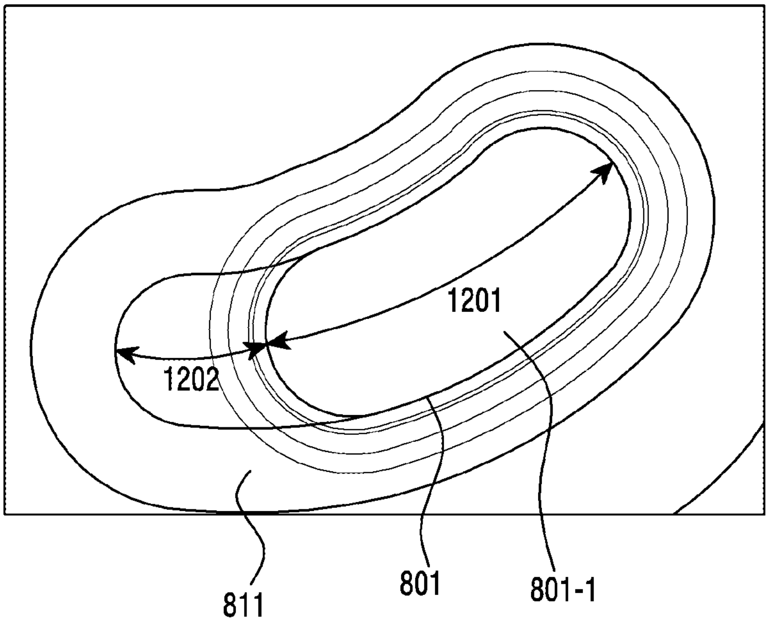
FIG. 12A is a diagram illustrating the length of a first recess according to various embodiments.
Figure 12B:
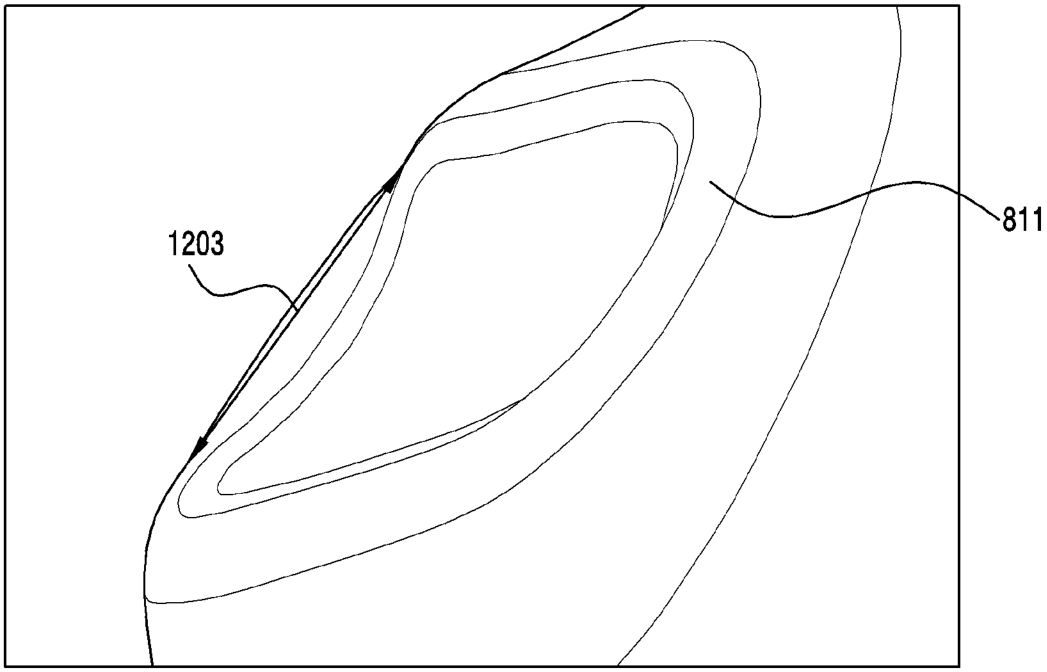
FIG. 12B is a diagram illustrating the width of the first recess according to various embodiments.
Figure 12C:
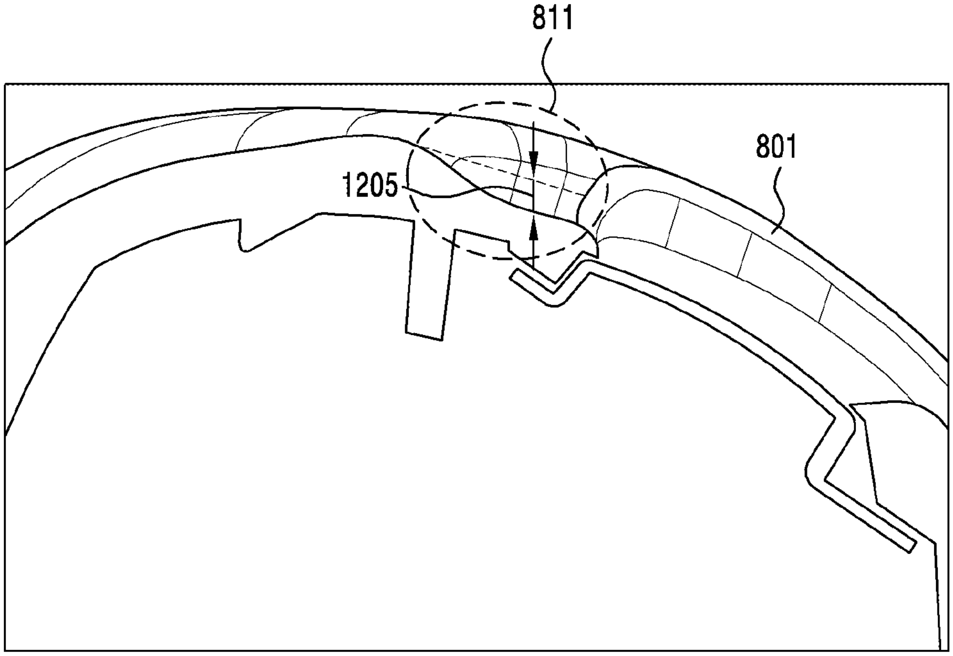
FIG. 12C is a diagram illustrating the depth of the first recess according to various embodiments.

FIG. 12A is a diagram illustrating the length of the first recess according to various embodiments, FIG. 12B is a diagram illustrating the width of the first recess according to various embodiments, and FIG. 12C is a diagram illustrating the depth of the first recess according to various embodiments.

Hereinafter, although the description has been made with reference to the electronic device 15, the description may also be applied to the electronic device 10 based on symmetrical features. Although the description has been made based on the first recess 811 included in the electronic device 15, the description may be substantially equally applied to the second recess 812.

FIGS. 12A, 12B and 12C (which may be referred to as FIGS. 12A to 12C) illustrate the structure of the first recess 811 included in the electronic device 15, and the structure of the first recess 811 may vary. For example, the first recess 811 may be connected to the first audio port 801, and may be provided in the third surface 810 in a direction that causes the sound output through the sound hole 801-1 of the first audio port 801 to be directed toward the user's ear (or eardrum) in the state in which the electronic device 15 is worn.

According to an embodiment, design specifications (e.g., length, thickness, and width) of the first recess 811 may vary depending on the size and shape of the user's ear. For example, the user's ear hole may have a maximum width of 10.9 mm, a minimum width of 5 mm, an average width of 7.7 mm, a maximum length of 17.5 mm, a minimum length of 9.8 m, and an average length of 13.8 mm. When the size of the user's ear hole is considered, the design specifications of the first recess 811 may be determined by considering the maximum values of the length and width of the user's ear hole or the circumference of the user's ear hole. For example, based on various characteristics of the user's ear hole, the first recess 801 may be designed such that, when the first audio port 801 is blocked by ⅓ or more, deterioration in sound quality caused by the blockage is compensated for by the first recess 811.

According to an embodiment, the first recess 811 may have a first length 1202 that prevents and/or reduces the first audio port 801 from being blocked depending on the size and shape of the user's ear in the state in which the electronic device 15 is worn. For example, referring to FIG. 12A, the length 1201 of the first audio port 801 may be 5 mm, and the first length 1202 of the first recess 811 may be 2 mm.

According to an embodiment, the first recess 811 may have a first width 1203 that is substantially the same as the width of the first audio port 801. For example, referring to FIG. 12B, the first width 1203 of the first recess 811 may be 2.7 mm, and may be substantially the same as the width of the first audio port 801.

According to an embodiment, the first recess 811 may have a first depth 1205 that prevents and/or reduces the first audio port 801 or the first recess 811 from being completely blocked even when the first audio port 801 or the first recess 811 is brought into contact with the user's body (e.g., the skin of the ear) in the state in which the electronic device 15 is worn. For example, referring to FIG. 12C, the first depth 1205 of the first recess 811 may be 0.3 mm. According to an embodiment, the first length 1205 of the first recess 811 may be substantially the same as the depth of the sound hole 801-1 of the first audio port 801.

According to an example embodiment, the electronic device may include: a housing including a first housing including a first surface facing a first direction and a second housing including a second surface facing a second direction opposite to the first direction; a first audio port including a sound hole disposed in the first surface of the housing; a speaker disposed inside the housing and configured to output sound to the outside through the sound hole of the first audio port; and a first recess extending from the first audio port. The first recess may extend from the first audio port by a first length in a first depth and a first width and may be configured to provide a path through which the sound output from the speaker moves in a state in which the electronic device is worn.

According to an example embodiment, the first depth may correspond to a shortest length between a surface of the first recess parallel to the first surface and an imaginary surface extending in parallel thereto from the first surface.

According to an example embodiment, the first depth may be determined to be less than or equal to the shortest length between one surface of the first audio port and an imaginary surface extending in parallel thereto from the first surface 110.

According to an example embodiment, the first width may be substantially equal to the width of the audio port.

According to an example embodiment, the electronic device may further include a second audio port including a sound hole disposed in the first surface of the housing.

According to an example embodiment, the electronic device may further include at least one microphone disposed in a corresponding area a space between the first audio port and the second audio port in the area inside the housing.

According to an example embodiment, the electronic device may include a speaker configured to output sound to the outside through the sound hole of the first audio port and the sound hole of the second audio port.

According to an example embodiment, the electronic device may further include a second recess extending from the second audio port.

According to an example embodiment, in the electronic device, the second recess may be spaced apart from the first recess.

According to an example embodiment, the second recess may extend from the second audio port by a second length in a second depth and a second width and may be configured to provide a path through which the sound output from the speaker moves in a state in which the electronic device is worn.

According to an example embodiment, the first depth may be greater than or equal to the second depth, the first width may be greater than or equal to the second width, and the first length may be greater than or equal to the second length.

According to an example embodiment, the first housing may include a first connector connected to the first surface, and the second housing may include a second connector connected to the second surface.

According to an example embodiment, the first housing and the second housing may be connected to each other through a connection between the first connector and the second connector.

According to an example embodiment, the housing may be worn in an external ear.

According to an example embodiment, the electronic device may further include: a first microphone port including a sound hole disposed in the second surface of the housing; and at least one microphone disposed inside the housing and configured to acquire sound through the sound hole of the first microphone port.

According to an example embodiment, the first recess may extend from the first audio port such that the sound output from the speaker is directed toward the ear in the state in which the electronic device is worn.

According to an example embodiment, an electronic device may include: a housing including a first housing including a first surface facing a first direction, and a second 12 including a second surface facing a second direction opposite to the first direction; a first audio port including a sound hole disposed in the first surface of the housing and a second audio port including a sound hole disposed in the second surface of the housing; a speaker disposed inside the housing and configured to output sound to the outside through the sound hole of the first audio port and the sound hole of the second audio port; and a first recess extending from the first audio port and a second recess extending from the second audio port and connected to the first recess.

According to an example embodiment, the electronic device may further include at least one microphone disposed in a corresponding area between the first audio port and the second audio port in an area inside the housing.

According to an example embodiment, the electronic device may include a speaker configured to output sound to the outside through the sound hole of the first audio port and the sound hole of the second audio port.

According to an example embodiment, the first recess may extend from the first audio port in a first depth and a first width and may be connected to the second recess extending from the second audio port in the second depth and the second width.

FIG. 13 is a block diagram illustrating an example electronic device 1301 in a network environment 1300 according to various embodiments.

Referring to FIG. 13, the electronic device 1301 in the network environment 1300 may communicate with an electronic device 1302 via a first network 1398 (e.g., a short-range wireless communication network), or may communicate with an electronic device 1304 or a server 1308 via a second network 1399 (e.g., a long-range wireless communication network). According to an embodiment, the electronic device 1301 may communicate with the electronic device 1304 via the server 1308. According to an embodiment, the electronic device 1301 may include a processor 1320, memory 1330, an input module 1350, a sound output module 1355, a display module 1360, an audio module 1370, a sensor module 1376, an interface 1377, a connection terminal 1378, a haptic module 1379, a camera module 1380, a power management module 1388, a battery 1389, a communication module 1390, a subscriber identification module (SIM) 1396, or an antenna module 1397. In various embodiments, at least one of these components (e.g., the connection terminal 1378) may be omitted, or one or more other components may be added to the electronic device 1301. In various embodiments, some of these components (e.g., the sensor module 1376, the camera module 1380, or the antenna module 1397) may be integrated into a single component (e.g., the display module 1360).

The processor 1320 may control at least one other component (e.g., a hardware or software component) of the electronic device 1301, which is connected to the processor 1320, and may perform various data processing or arithmetic operations by executing, for example, software (e.g., a program 1340). According to an embodiment, as at least a part of data processing or calculation, the processor 1320 may store instructions or data received from another component (e.g., the sensor module 1376 or the communication module 1390) in volatile memory 1332, and may process the instructions or data stored in the volatile memory 1332 and store the resulting data in nonvolatile memory 1334. According to an embodiment, the processor 1320 may include a main processor 1321 (e.g., a central processing unit or an application processor), or an auxiliary processor 1323, which operates independently from or together with the main processor 1321 (e.g., a graphics processing device, a neural processing unit (NPU), an image signal processor, a sensor hub processor, or a communication processor). For example, when the electronic device 1301 includes a main processor 1321 and an auxiliary processor 1323, the auxiliary processor 1323 may use less power than the main processor 1321 or may be set to be specialized for a predetermined function. The auxiliary processor 1323 may be implemented separately from or as a part of, the main processor 1321.

The auxiliary processor 1323 may control at least some functions or states associated with at least one of the components of the electronic device 1301 (e.g., the display module 1360, the sensor module 1376, or the communication module 1390), on behalf of the main processor 1321, for example, while the main processor 1321 is in an inactive (e.g., sleep) state, or together with the main processor 1321, for example, while the main processor 1321 is in an active (e.g., application execution) state. According to an embodiment, the auxiliary processor 1323 (e.g., an image signal processor or a communication processor) may be implemented as some of other functionally related components (e.g., the camera module 1380 or the communication module 1390). According to an embodiment, the auxiliary processor 1323 (e.g., a neural network processing device) may include a hardware structure specialized for processing an artificial intelligence model. The artificial intelligence model may be created through machine learning. Such learning may be performed, for example, in the electronic device 1301 itself on which artificial intelligence is executed, or may be performed through a separate server (e.g., the server 1308). The learning algorithm may include, for example, supervised learning, unsupervised learning, semi-supervised learning, or reinforcement learning, but is not limited thereto. The artificial intelligence model may include a plurality of artificial neural network layers. An artificial neural network may be any of a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-networks, or a combination of two or more of the above-mentioned networks, but is not limited to the above-mentioned examples. In addition to the hardware structure, the artificial intelligence model may additionally or alternatively include a software structure.

The memory 1330 may store various data to be used by at least one component of electronic device 1301 (e.g., the processor 1320 or the sensor module 1376). The data may include, for example, input data or output data for software (e.g., the program 1340) and instructions associated therewith. The memory 1330 may include, for example, volatile memory 1332 or nonvolatile memory 1334.

The program 1340 may be stored in the memory 1330 as software, and may include, for example, an operating system 1342, middleware 1344, or application 1346.

The input module 1350 may receive instructions or data to be used in a component (e.g., the processor 1320) of the electronic device 1301 from the outside (e.g., the user) of the electronic device 1301. The input module 1350 may include, for example, a microphone, a mouse, a keyboard, a key (e.g., a button), or a digital pen (e.g., a stylus pen).

The sound output module 1355 may output sound signals to the outside of the electronic device 1301. The sound output module 1355 may include, for example, a speaker or a receiver. The speaker may be used for general purposes such as multimedia playback or recording playback. The receiver may be used to receive an incoming call. According to an embodiment, the receiver may be implemented separately from or as a part of the speaker.

The display module 1360 may visually provide information to the outside (e.g., the user) of the electronic device 1301. The display module 1360 may include, for example, a display, a hologram device, or a projector, and a control circuit for controlling the device. According to an embodiment, the display module 1360 may include a touch sensor configured to detect a touch or a pressure sensor configured to measure the intensity of force generated by the touch.

The audio module 1370 may convert sound into an electrical signal, or vice versa. According to an embodiment, the audio module 1370 may acquire sound through the input module 1350 or may output sound through the sound output module 1355 or an external electronic device (e.g., the electronic device 1302) (e.g., a speaker or headphone) directly or wirelessly connected with the electronic device 1301.

The sensor module 1376 may detect an operating state (e.g., power or temperature) of the electronic device 1301 or an external environmental state (e.g., the user state), and may generate an electrical signal or a data value corresponding to the sensed state. According to an embodiment, the sensor module 1376 may include, for example, a gesture sensor, a gyro sensor, an atmospheric pressure sensor, a magnetic sensor, an acceleration sensor, a grip sensor, a proximity sensor, a color sensor, an IR (infrared) sensor, a biometric sensor, a temperature sensor, a humidity sensor, or an illuminance sensor.

The interface 1377 may support one or more predetermined protocols that may be used by the electronic device 1301 so as to be directly or wirelessly connected to an external electronic device (e.g., the electronic device 1302). According to an embodiment, the interface 1377 may include, for example, a high-definition multimedia interface (HDMI), a universal serial bus (USB) interface, an SD card interface, or an audio interface.

The connection terminal 1378 may include a connector through which the electronic device 1301 may be physically connected to an external electronic device (e.g., the electronic device 1302). According to an embodiment, the connection terminal 1378 may include, for example, an HDMI connector, a USB connector, an SD card connector, or an audio connector (e.g., a headphone connector).

The haptic module 1379 may convert an electrical signal into a mechanical stimulus (e.g., vibration or motion) or an electrical stimulus that may be perceived by the user through a tactile or kinesthetic sense. According to an embodiment, the haptic module 1379 may include, for example, a motor, a piezoelectric element, or an electrical stimulation device.

The camera module 1380 is capable of capturing a still image and a video image. According to an embodiment, the camera module 1380 may include one or more lenses, image sensors, image signal processors, or flashes.

The power management module 1388 may manage the power to be supplied to the electronic device 1301. According to an embodiment, the power management module 1388 may be implemented as at least a portion of, for example, a power management integrated circuit (PMIC).

The battery 1389 may supply power to at least one component of the electronic device 1301. According to an embodiment, the battery 1389 may include, for example, a non-rechargeable primary battery, a rechargeable secondary battery, or a fuel cell.

The communication module 1390 may establish a direct (e.g., wired) communication channel or a wireless communication channel between the electronic device 1301 and an external electronic device (e.g., the electronic device 1302, the electronic device 1304, or the server 1308), and may support communication via the established communication channel. The communication module 1390 may include one or more communication processors, which are operated independently from a processor 1320 (e.g., an application processor) and support direct (e.g., wired) communication or wireless communication. According to an embodiment, the communication module 1390 may include a wireless communication module 1392 (e.g., a cellular communication module, a short-range wireless communication module, or a global navigation satellite system (GNSS) communication module) or a wired communication module 1394 (e.g., a local area network (LAN) communication module or a power line communication module). A corresponding one of these communication modules may communicate with an external electronic device 1304 via a first network 1398 (e.g., a short-range communication network such as Bluetooth, wireless fidelity (Wi-Fi) direct, or infrared data association (IrDA)) or a second network 1399 (e.g., a legacy cellular network, a 5G network, a next generation communication network, the Internet, or a computer network (e.g., a telecommunication network such as a LAN or a WAN)). These various types of communication modules may be integrated into one component (e.g., a single chip) or may be implemented as a plurality of components (e.g., a plurality of chips) that are separated from each other. The wireless communication module 1392 may identify or authenticate the electronic device 1301 in a communication network such as the first network 1398 or the second network 1399 using subscriber information (e.g., international mobile subscriber identity (IMSI)) stored in a subscriber identification module 1396.

The wireless communication module 1392 may support a 5G network after a 4G network and a next-generation communication technology, such as a new radio (NR) access technology. The NR access technology may support high-speed transmission of high-capacity data (enhanced mobile broadband (eMBB)), minimization and/or reduction of terminal power and connection of multiple terminals (massive machine type communications (mMTC)), or ultra-reliable and low-latency communications (URLLC). The wireless communication module 1392 may support a high-frequency band (e.g., a mmWave band) in order to achieve, for example, a high data transmission rate. The wireless communication module 1392 may support various technologies for securing performance in a high-frequency band, such as beamforming, massive multiple-input and multiple-output (MIMO), full-dimensional multiple-input and multiple-output (FD-MIMO), an array antenna, analog beam-forming, or a large-scale antenna. The wireless communication module 1392 may support various requirements specified in the electronic device 1301, an external electronic device (e.g., the electronic device 1304), or a network system (e.g., the second network 1399). According to an embodiment, the wireless communication module 1392 may support a peak data rate for realizing eMBB (e.g., 20 Gbps or higher), loss coverage for realizing mMTC (e.g., 164 dB or lower), or U-plane latency for realizing URLLC (e.g., 0.5 ms or less for each of downlink (DL) and uplink (UL) or 1 ms or less for round trip).

The antenna module 1397 may transmit/receive signals or power to/from the outside (e.g., an external electronic device). According to an embodiment, the antenna module 1397 may include an antenna including a radiator made of a conductor or a conductive pattern provided on a substrate (e.g., a PCB). According to an embodiment, the antenna module 1397 may include a plurality of antennas (e.g., an array antenna). In such a case, at least one antenna, which is suitable for a communication scheme used in a communication network, such as the first network 1398 or the second network 1399, may be selected by, for example, the communication module 1390 from the plurality of antennas. Signals or power may be transmitted or received between the communication module 1390 and the external electronic device via the at least one selected antenna. According to various embodiments, other components (e.g., a radio-frequency integrated circuit (RFIC)) may be further provided as a portion of the antenna module 1397 in addition to the radiator.

According to various embodiments, the antenna module 1397 may configure a mmWave antenna module. According to an embodiment, the mmWave antenna module may include a printed circuit board, an RFIC that is disposed on or adjacent to a first surface (e.g., the bottom surface) of the printed circuit board and is capable of supporting a predetermined high-frequency band (e.g., a mmWave band), and a plurality of antennas (e.g., array antennas) that is disposed on or adjacent to a second surface (e.g., the top surface or the side surface) of the printed circuit board and is capable of transmitting or receiving a signal of the predetermined high-frequency band.

At least some of the above-mentioned components may be connected to each other via a communication scheme between peripheral devices (e.g., a bus, a general-purpose input and output (GPIO), a serial peripheral interface (SPI), or a mobile industry processor interface (MIPI)), and may exchange signals (e.g., commands or data) therebetween.

According to an embodiment, the instructions or data may be transmitted or received between the electronic device 1301 and the external electronic device 1304 via the server 1308 connected to the second network 1399. Each of the external electronic devices 1302 or 1304 may be of a type, which is the same as or different from the electronic device 1301. According to an embodiment, all or some of the operations executed in the electronic device 1301 may be executed in at least one of the external electronic devices 1302, 1304, or 1308. For example, when the electronic device 1301 is to perform a function or service automatically, or in response to a request from a user or other device, the electronic device 1301 may request that one or more external electronic devices perform the function or at least part of the service, in place of or in addition to performing the function or service by itself. The at least one external electronic device that receives the request may execute at least a part of the requested function or service, or an additional function or service associated with the request, and may deliver the result of the execution to the electronic device 1301. As at least a part of the response to the request, the electronic device 1301 may provide the result as it is or after additionally processing the result. To this end, for example, cloud computing, distributed computing, mobile edge computing (MEC), or client-server computing technology may be used. The electronic device 1301 may provide an ultra-low delay service using, for example, distributed computing or mobile edge computing. In an embodiment, the external electronic device 1304 may include an Internet of things (IoT) device. The server 1308 may be an intelligent server using machine learning and/or neural networks. According to an embodiment, the external electronic device 1304 or the server 1308 may be included in the second network 1399. The electronic device 1301 may be applied to an intelligent service (e.g., smart home, smart city, smart car, or healthcare) based on a 5G communication technology and an IoT-related technology.

An electronic device according to various embodiments disclosed herein may be any of various types of devices. The electronic device may include, for example, a portable communication device (e.g., a smartphone), a computer device, a portable multimedia device, a portable medical device, a camera, a wearable device, a home appliance, or the like. The electronic device according to an embodiment disclosed herein is not limited to the above-described devices.

It should be understood that various embodiments of the disclosure and terms for describing the embodiments are not intended to limit the technical features disclosed herein to specific embodiments, and that the embodiments include various modifications, equivalents, and/or substitutions of the corresponding embodiments. In connection with the description of the drawings, similar or related components may be denoted by similar reference numerals. The singular form of a noun corresponding to an item may include one or more of the items unless the context clearly indicates otherwise. In the disclosure, each of phrases, such as "A or B," "at least one of A and B," "at least one of A or B," "A, B, or C," "at least one of A, B, and C," and "at least one of A, B, or C" may include any one of the items listed together in the corresponding phrase or all possible combinations of the items. Terms such as "$1^{st}$," "$2^{nd}$," "first," and "second" may simply be used to distinguish corresponding components from the other components, and the components are not limited in other respects (e.g., importance or order). When one (e.g., a first) component is mentioned as being "coupled" or "connected" to another (e.g., a second) component, with or without the term "functionally" or "communicatively," the one component may be connected to the another component directly (e.g., in a wired manner), wirelessly, or via a third component.

In various embodiments herein, the term "module" used herein may include a unit implemented in hardware, software, or firmware, or any combination thereof, and may be used interchangeably with terms such as "logic," "logic block," "component," "circuit," or the like. The module may be an integrally configured component or a minimum unit or a portion of the component, which performs one or more functions. For example, according to an embodiment, the module may be implemented in the form of an application-specific integrated circuit (ASIC).

Various embodiments disclosed herein may be implemented by software (e.g., the program 1340) including one or more instructions stored in a storage medium (e.g., the internal memory 1336 or the external memory 1338) readable by a machine (e.g., the electronic device 1301). For example, a processor (e.g., the processor 1320) of a machine (e.g., the electronic device 1301) may call and execute at least one of the stored one or more instructions from the storage medium. This enables the machine to be operated to perform at least one function in response to the at least one called instruction. The one or more instructions may include codes generated by a compiler or code capable of being executed by an interpreter. The machine-readable storage medium may be provided in the form of a non-transitory storage medium. Here, the "non-transitory" storage medium is a tangible device and may not contain a signal (e.g., electromagnetic waves), and this term is not intended to distinguish a case where data is permanently stored on the storage medium and a case where data is temporarily stored.

According to an embodiment, a method according to various embodiments disclosed herein may be included and provided in a computer program product. The computer program product may be traded as a product between a seller and a purchaser. The computer program product may be distributed in the form of a machine-readable storage medium (e.g., a compact disc read-only memory (CD-ROM)), or may be directly distributed through an application store (e.g., Play Store™), directly between two user devices (e.g., smartphones), or may be distributed online (e.g., downloaded or uploaded). In the case of online distribution, at least a part of the computer program product may be temporarily stored in or temporarily produced from a machine-readable storage medium such as a manufacturer's server, a server of an application store, or memory of a relay server.

According to various embodiments, each of the above-described components (e.g., module or program) may include a single object or a plurality of objects, and some of the plurality of objects may be separated and disposed in other components, respectively. According to various embodiments, one or more of the components or operations described above may be omitted, or one or more other components or operations may be added. Alternatively or additionally, a plurality of components (e.g., modules or programs) may be integrated into one component. In such a case, an integrated component may perform one or more functions of each of the plurality of components in the same or similar manner as when performed by the corresponding one of the plurality of components prior to the integration. According to various embodiments, operations performed by a module, a program, or other components may be performed sequentially, in parallel, repetitively, or heuristically, one or more of the operations may be performed in a different order or omitted, or one or more other operations may be added thereto.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

a housing comprising a first housing with a first portion facing a first direction and a second housing with a second portion facing a second direction opposite to the first direction;

a first audio port comprising a sound hole formed in the first portion of the housing;

a speaker disposed inside the housing and configured to output sound to outside through the sound hole of the first audio port; and a first recess extending from the first audio port, wherein the first recess extends from the first audio port by a first length in a first depth and a first width and is configured to provide a path through which the sound output from the speaker moves in a state in which the electronic device is worn, wherein the first recess is configured such that the sound output through the sound hole of the first audio port propagates through the first recess in a direction substantially perpendicular to the first direction and the second direction.

2. The electronic device of claim 1, wherein the first depth corresponds to a shortest length between a surface of the first recess parallel to the first surface and an imaginary surface extending in parallel to the surface of the first recess from the first surface.

3. The electronic device of claim 1, wherein the first depth is less than or equal to a shortest length between one surface of the first audio port and an imaginary surface extending in parallel to the one surface of the first audio port from the first surface.

4. The electronic device of claim 1, wherein the first width is substantially equal to a width of the audio port.

5. The electronic device of claim 1, further comprising a second audio port comprising a sound hole disposed in the first surface of the housing.

6. The electronic device of claim 5, further comprising at least one microphone disposed in an area corresponding to a space between the first audio port and the second audio port in an area inside the housing.

7. The electronic device of claim 5, further comprising a second recess extending from the second audio port.

8. The electronic device of claim 7, wherein the second recess is spaced apart from the first recess.

9. The electronic device of claim 7, wherein the second recess extends from the second audio port by a second length in a second depth and a second width and is configured to provide a path through which the sound output from the speaker moves in a state in which the electronic device is worn.

10. The electronic device of claim 9, wherein the first depth is greater than or equal to the second depth, the first width is greater than or equal to the second width, and the first length is greater than or equal to the second length.

11. The electronic device of claim 1, wherein the first recess extends from the first audio port such that the sound output from the speaker is directed toward a user's ear in a state in which the electronic device is worn.

12. An electronic device comprising:

a housing comprising a first housing with a first portion facing a first direction and a second housing with a second portion facing a second direction opposite to the first direction;

a first audio port comprising a sound hole disposed in the first portion of the housing and a second audio port comprising a sound hole disposed in the second portion of the housing;

a speaker disposed inside the housing and configured to output sound to outside through the sound hole of the first audio port and the sound hole of the second audio port; and a first recess extending from the first audio port and a second recess extending from the second audio port and connected to the first recess, wherein at least the first recess is configured such that the sound output through the sound hole of the first audio port propagates through the first recess in a direction substantially perpendicular to the first direction and the second direction.

13. The electronic device of claim 12, further comprising at least one microphone disposed in an area corresponding to a space between the first audio port and the second audio port in an area inside the housing.

14. The electronic device of claim 12, further comprising a speaker configured to output sound to the outside through the sound hole of the first audio port and the sound hole of the second audio port.

15. The electronic device of claim 12, wherein the first recess extends from the first audio port in a first depth and a first width and is connected to the second recess extending from the second audio port in the second depth and the second width.

* * * * *